A. L. SHUTTER.
SPARE TIRE HOLDER.
APPLICATION FILED MAR. 15, 1911.
1,007,394.
Patented Oct. 31, 1911.
2 SHEETS—SHEET 1.
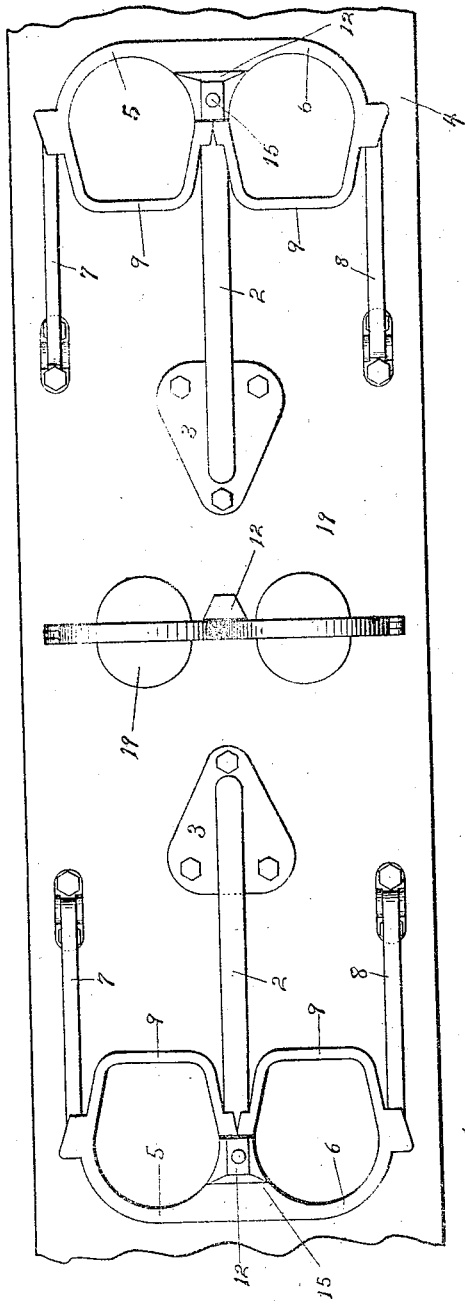
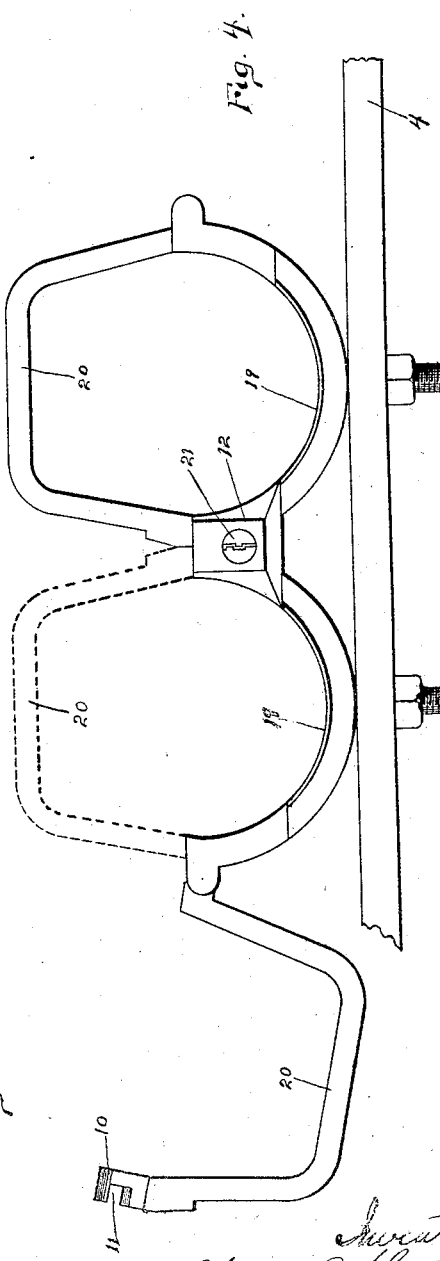
Fig. 1.
Fig. 4.
Witnesses
M. P. Nichols
C. L. Weed
Inventor
Abram L. Shutter
by Seymour Teare
Frederic Teare
Attys

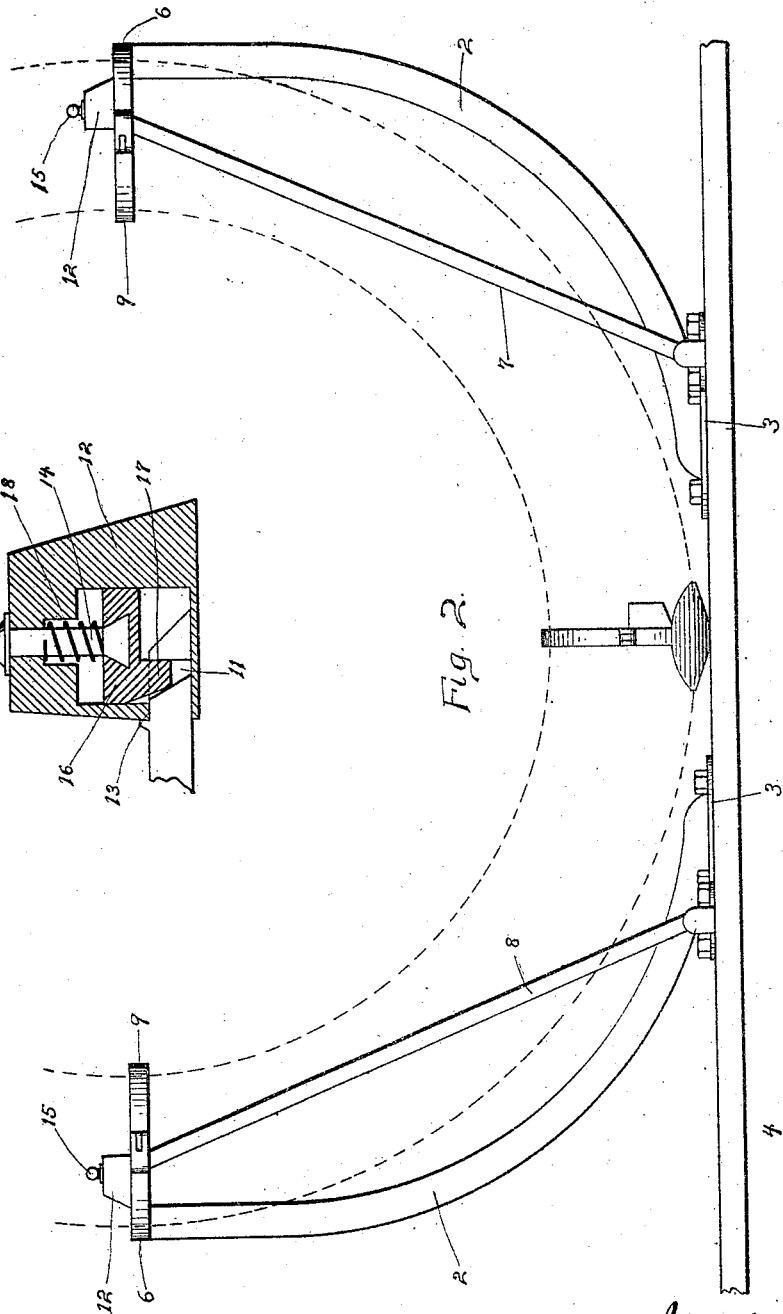

UNITED STATES PATENT OFFICE.

ABRAM L. SHUTTER, OF WEST HAVEN, CONNECTICUT.

SPARE-TIRE HOLDER.

1,007,394.

Specification of Letters Patent. Patented Oct. 31, 1911.

Application filed March 15, 1911. Serial No. 614,671.

*To all whom it may concern:*

Be it known that I, ABRAM L. SHUTTER, a citizen of the United States, residing at West Haven, in the county of New Haven and State of Connecticut, have invented a new and useful Improvement in Spare-Tire Holders; and I do hereby declare the following, when taken in connection with the accompanying drawings and the letters of reference marked thereon, to be a full, clear, and exact description of the same, and which said drawings constitute part of this specification, and represent, in—

Figure 1 a top or plan view of a spare tire holder constructed in accordance with my invention. Fig. 2 a side view of the same. Fig. 3 a sectional view of the locking bolt. Fig. 4 a front view upon an enlarged scale of the auxiliary supporting and locking mechanism.

This invention relates to an improvement in spare tire holders, that is, a device adapted to support spare tires.

In many cases it is desirable that these holders should be supported or attached to some part of an automobile other than the body; and the object of this invention is to produce a tire holder which may be supported entirely from the running-board, and also in providing means for securely locking a tire in the holder; and the invention consists in the construction hereinafter described and particularly recited in the claims.

In carrying out my invention I employ two posts 2 each formed at its lower end with a flat foot 3 which is adapted to be bolted to the running board 4 of an automobile, the posts being arranged to extend in opposite direction and in line with each other. Secured to the upper end of each post is a double yoke 5, 6, so as to provide for holding two spare tires. The opposite sides of the double yokes are supported by stay rods 7 and 8 which extend down to and are secured to the running board. Hinged to the outer horns of the yokes are latches 9 the inner end of each latch having a nose 10 formed with a locking notch 11 which is adapted to enter a housing 12 arranged between the inner horns of each pair of yokes. The housing has a clearance opening 13 for the nose 10 and in the housing is mounted a vertically movable rod 14 having a finger piece 15 by which it may be lifted, and the outer end of the rod is a locking bolt 16 having a finger 17 adapted to enter the notch 11. Between the bolt and the casing is a spiral spring 18 adapted to force the bolt downward. The finger 17 and the notch 11 are tapered so that any play will be taken up and the end of the latch 9 held firmly against the housing. Centrally arranged between the posts 2 and secured to the running board is a similarly arranged auxiliary locking device consisting of a pair of yokes in the form of concave plates 19 with latches 20 similar to the latches 9, but instead of having a spring bolt for holding the ends of the latches in position, they may be held by locking mechanism operated by a key through a roll-back 21 mounted in the housing 12. This locking mechanism may be of any approved form and does not require illustration or description. The spare tires to be held rest on the plates 19 and may be locked therein, as before stated, by a key. The tires are then supported by the yokes 5 and 6, and are rigidly held in place by the latches 9. I thus provide a firm support for spare tires which may be entirely supported by the running-board and provides for the ready removal of one tire without disengaging the other.

I claim:—

1. A spare tire holder comprising a pair of yokes, locking mechanism arranged between the inner horns of the yokes, and a latch hinged to the outer horn of each yoke the inner ends of the latches adapted to be engaged by said locking means.

2. A spare tire holder including means for supporting opposite sides of tires, and locking mechanism comprising a pair of yokes arranged between the supporting means, locking mechanism arranged between the inner horns of the yokes, a latch pivotally connected with the outer horn of each pair of yokes the inner ends of the latches adapted to be engaged by said locking mechanism, substantially as described.

In testimony whereof, I have signed this specification in the presence of two subscribing witnesses.

ABRAM L. SHUTTER.

Witnesses:
 CHAS. E. GRAHAM,
 WALTER G. SHUTTER.